May 23, 1950  R. L. FEARN  2,508,859
APPARATUS FOR FORMING SINUOUS BENDS
Filed Jan. 4, 1947  8 Sheets-Sheet 1
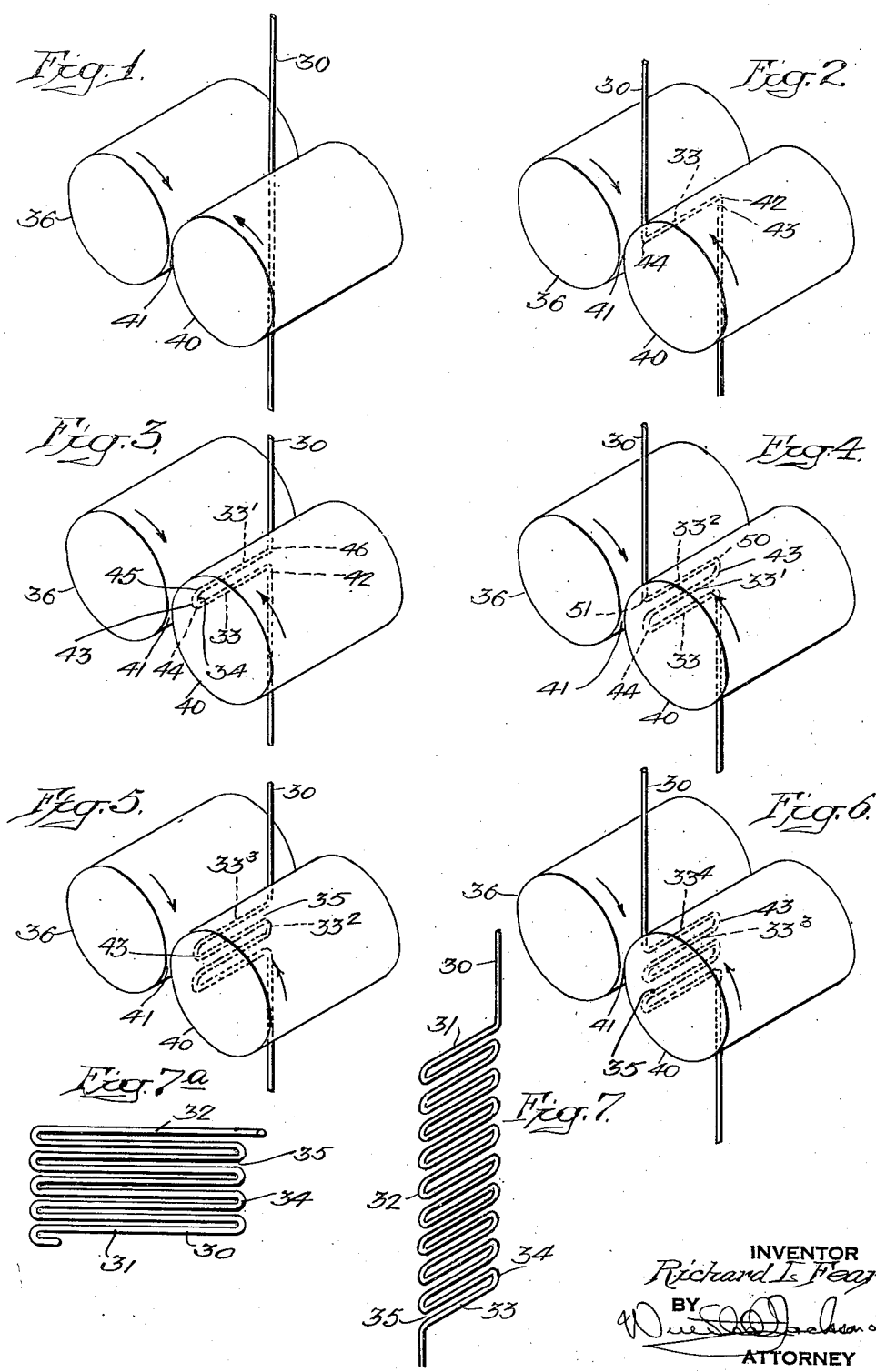
INVENTOR
Richard L. Fearn.
BY
ATTORNEY

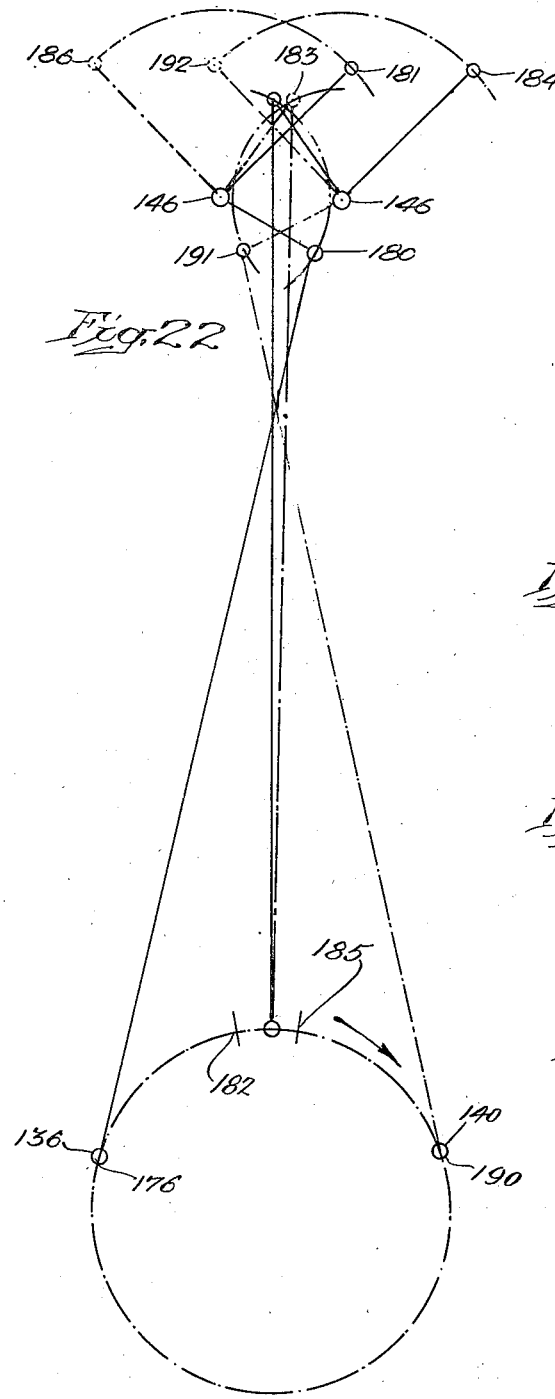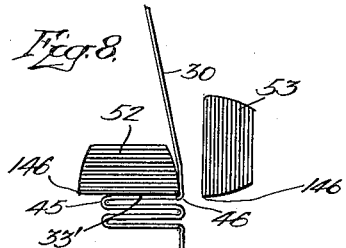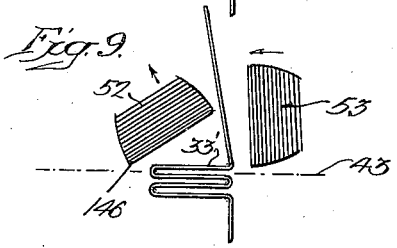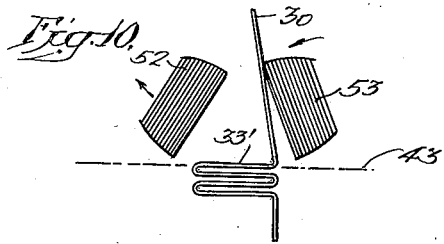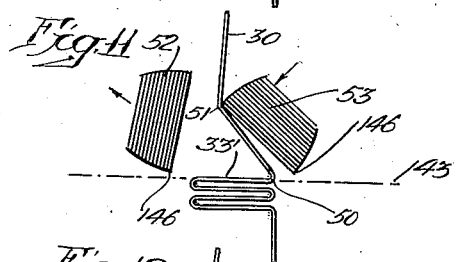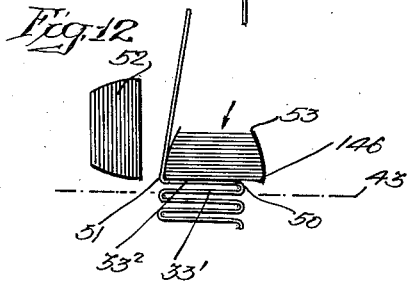

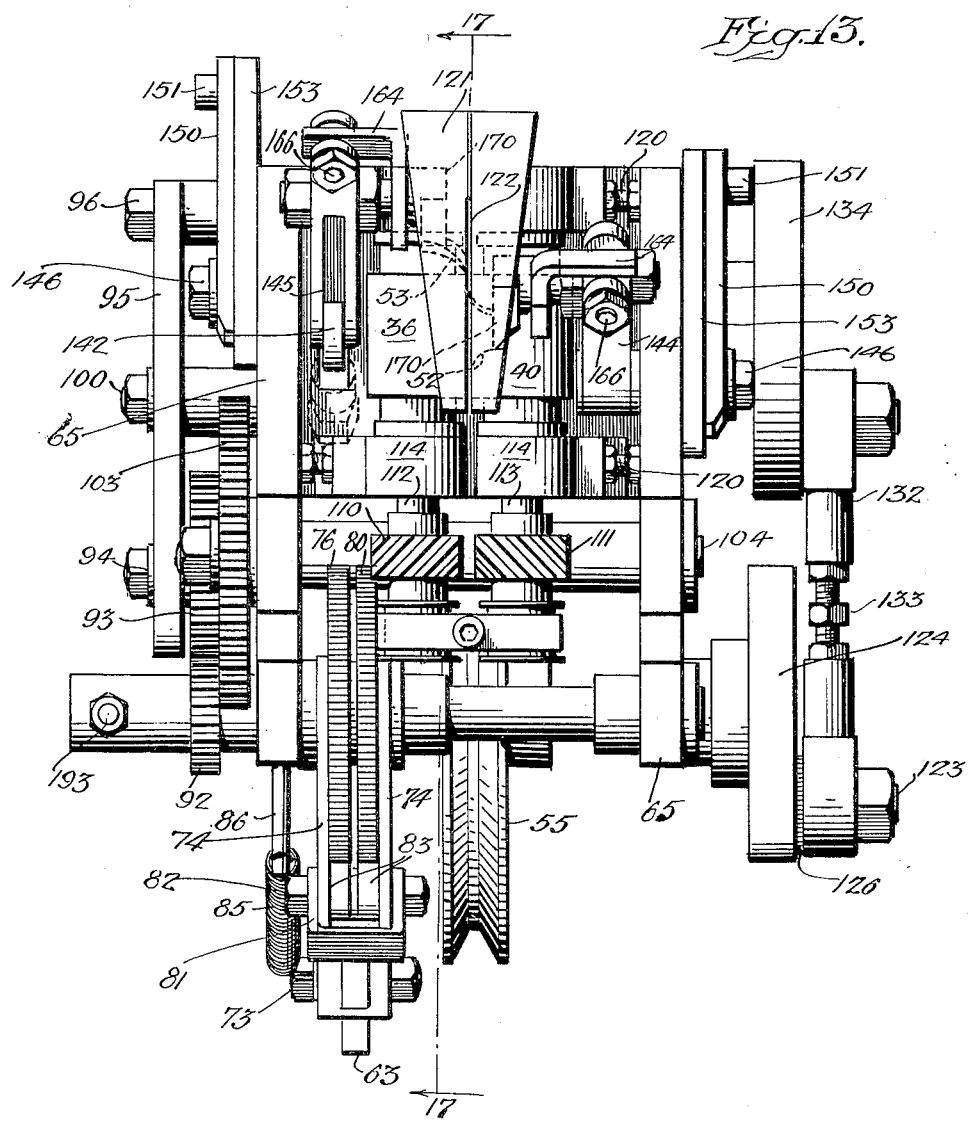

May 23, 1950  R. L. FEARN  2,508,859
APPARATUS FOR FORMING SINUOUS BENDS
Filed Jan. 4, 1947  8 Sheets-Sheet 4

INVENTOR
Richard L. Fearn
BY
ATTORNEY

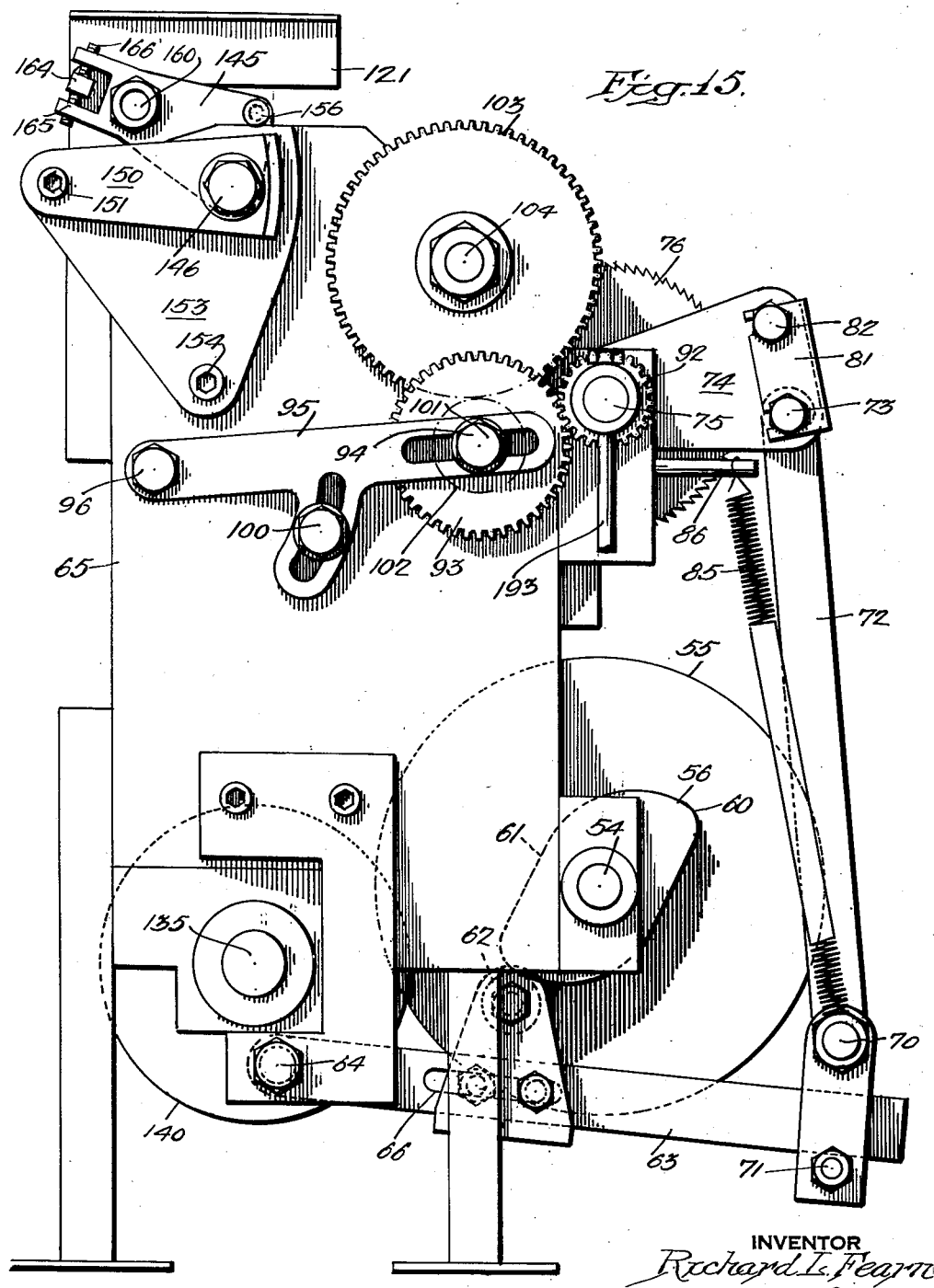

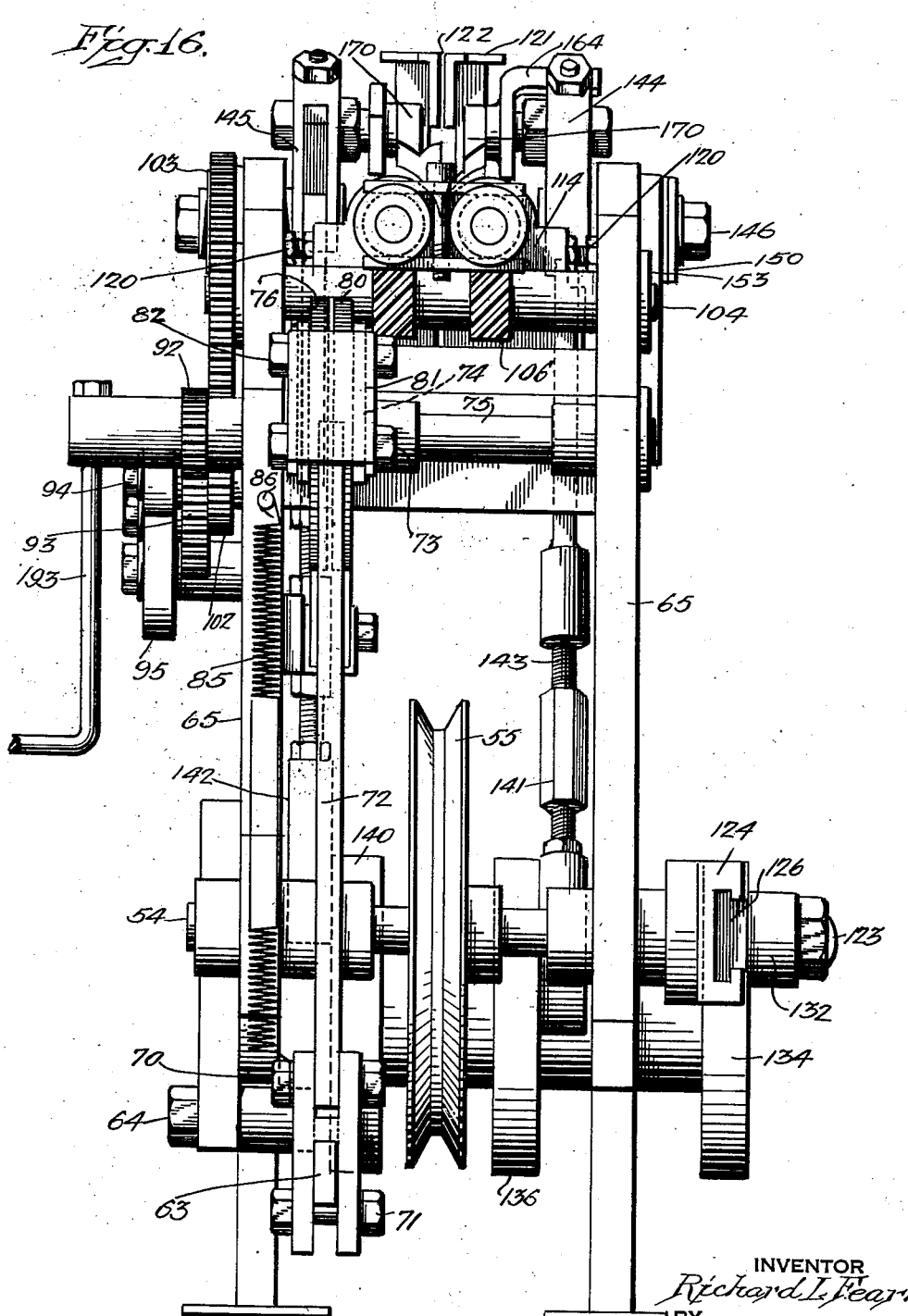

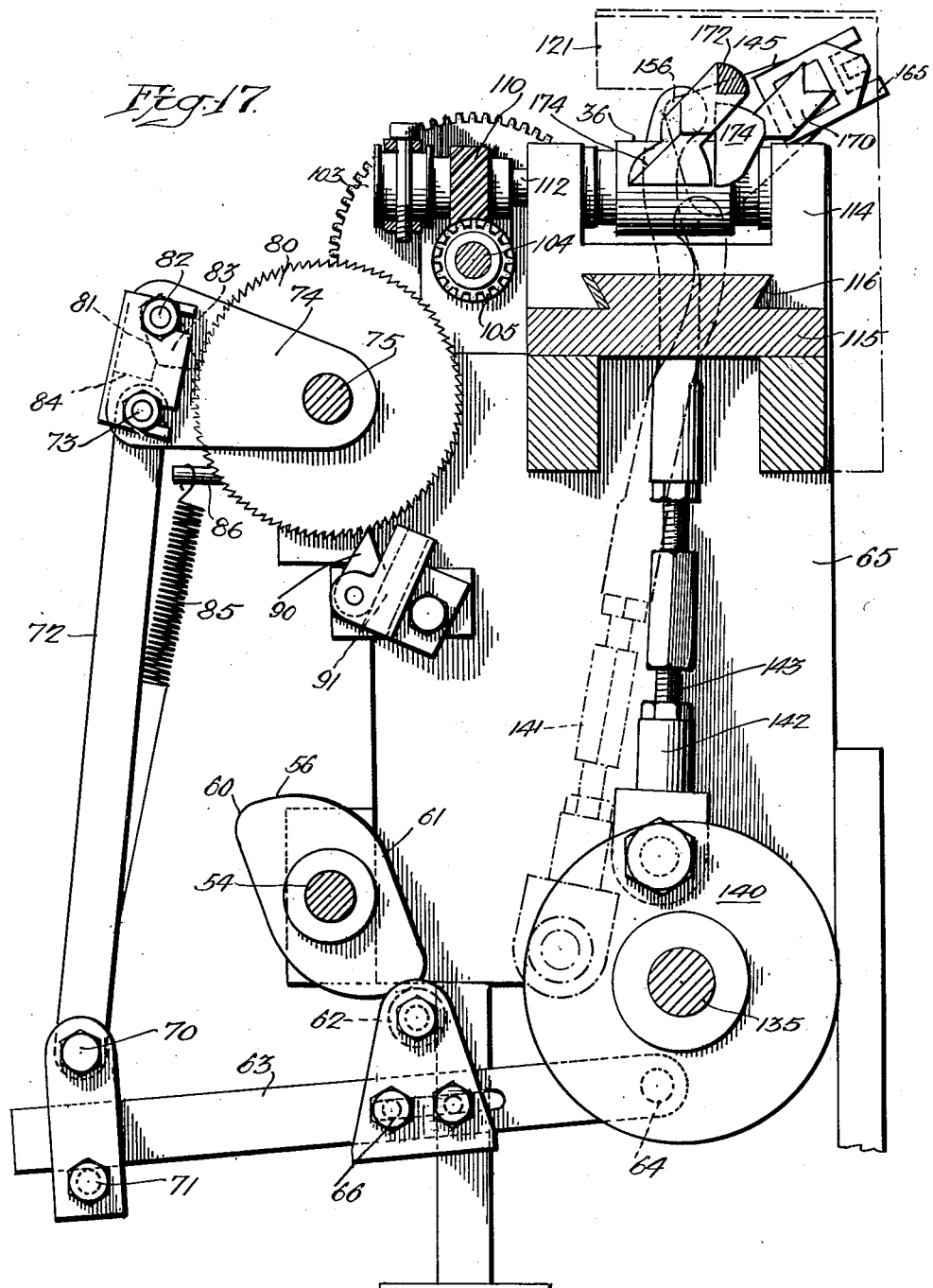

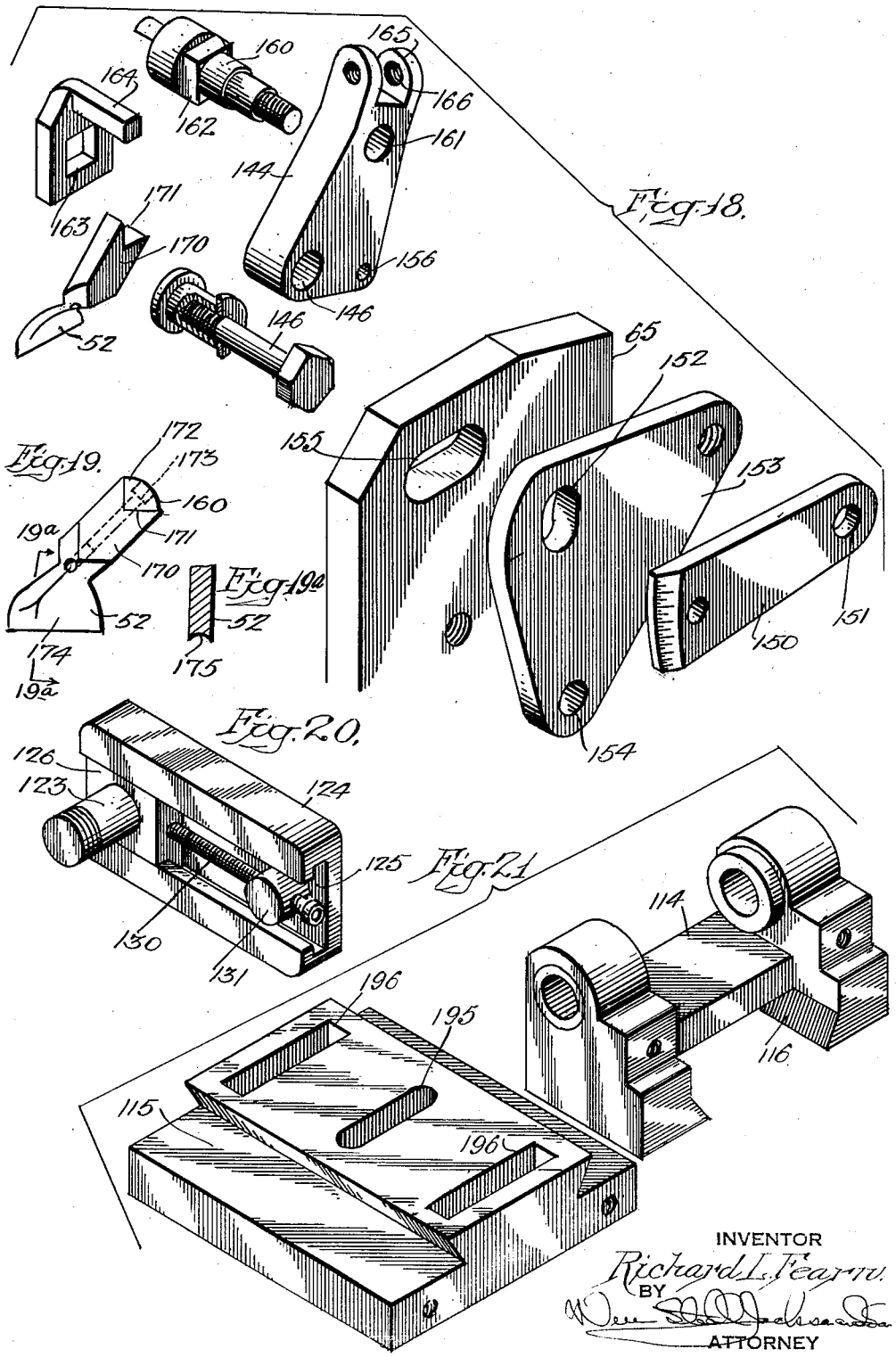

Patented May 23, 1950

2,508,859

UNITED STATES PATENT OFFICE 2,508,859

APPARATUS FOR FORMING SINUOUS BENDS

Richard L. Fearn, York, Pa., assignor to Heatron, Incorporated, York, Pa., a corporation of Pennsylvania Application January 4, 1947, Serial No. 720,187

16 Claims. (Cl. 140—71)

My invention relates to the process of bending wire, the mechanism for wire bending, and to sinuous ribbons thus produced.

A purpose of my invention is to hold wire between the ends of and in the bite of cooperating rolls during bending.

A further purpose is to form a wire bend section, such as half of a sinuous bend, in the converging jaw space on the approaching side of cooperating rolls and between the ends of the rolls.

A further purpose is to grip the previous sinuous bend section between the ends of and in the bite of cooperating rolls while forming the succeeding sinuous bend section.

A further purpose is to bend wire passing transversely through cooperating rolls having parallel axes successively back and forth, gripping each previous bend section between the ends of and in the bite of the rolls, while forming the succeeding sinuous bend section in the converging jaw space on the approaching side of the rolls, and preferably advancing the rolls intermittently only during the times when bending is not taking place.

A further purpose is to move tucking fingers alternately from one side and the other into the converging jaw space on the approaching side of cooperating rolls, and preferably to synchronize the motion with intermittent advance of the rolls, so that the rolls advance only during periods when the tucking fingers are nearing the end of their movement forward into the converging jaw space.

A further purpose is to form a sinuous ribbon by bending into the converging jaw space of cooperating rolls, making each bend by a tucking operation into the space, and intermittently advancing the rolls to grip each previous bend while the next succeeding bend is being made.

A further purpose is to pivot the tucking fingers on pivots extending transversely to the roll axes, and preferably adjustable toward and away from one another to control the width of the sinuous ribbon.

A further purpose is to adjust the rolls for spacing and for distance of forward motion to make sinuous ribbons between the roll ends using different sizes of wire, different widths of ribbon and different spacings of sinuous bends.

A further purpose is to adjust the tucking fingers for total angular movement with respect to the synchronized advance of the rolls, for individual angular movement with respect to one another, for angular relationship with respect to one another, for pivotal spacing from one another, and for pivotal position individually with respect to one another.

A further purpose is to provide controlled acceleration and deceleration of the finger movement to allow the greatest amount of time for advancing the rolls, while a finger is near to its extreme forward position.

A further purpose is to produce sinuous ribbon of variant widths and sinuous spacings and from various sizes of wire without the necessity of frequent change in dies, and with rapid adjustment of the machine to convert from one size to another.

A further purpose is to permit closer sinuous bending so that the sinuous ribbon will behave structurally and electrically as a ribbon, rather than as a wire.

A further purpose is to locate the sinuous bends so that the total surface of the wire is at least as great as the total surface of a solid ribbon of corresponding over-all dimensions, so as to increase the radiating surface for electric heating purposes, provide the greatest possible amount of resistance in a given size of electrical resistor, and increase the load transmitting and energy transferring surface and cross section for mechanical and spring purposes, such as tension, compression, torsion, upholstery and furniture springs, jewelry components, wrist watch bands, combs, rakes, electric heaters, electric resistors, and other similar components.

A further purpose is to fold wire into a sinuous ribbon as described, holding the wire between rolls, and between the ends of the rolls, and to advance the rolls and the ribbon between the rolls by forward motion of the wire, clamped by the rolls, under the pressure of the fingers directly or indirectly on the wire so held, the rolls acting as idlers in this case.

Further purposes appear in the specification and in the claims.

In the drawings I have chosen to illustrate one only of the various embodiments in which my invention appears, choosing the form shown from the standpoint of convenience in illustration, satisfactory operation, and clear demonstration of the principles involved.

Figures 1 to 6 inclusive are diagrammatic perspectives showing successive steps in forming the sinuous ribbon of the present invention, with particular emphasis upon roll operation.

Figure 7 is a perspective illustrating the final product diagrammatically, without attempt to show the exact dimensional relationship.

Figure 7ª is an elevation of a portion of the ribbon of Figure 7.

Figures 8 to 12 inclusive are diagrammatic side elevations illustrating the progressive steps of forming the sinuous tape of the invention, with emphasis on the tucking operation.

Figure 13 is a top plan of my improved tape forming machine.

Figure 15 is a left side elevation of Figure 13.

Figure 16 is a front elevation of Figure 13.

Figure 17 is a stepped section of Figure 13 on the line 17—17.

Figure 18 is an exploded fragmentary view of the tucking finger adjustment and mounting.

Figure 19 is a side elevation of the tucking finger mounting.

Figure 14:
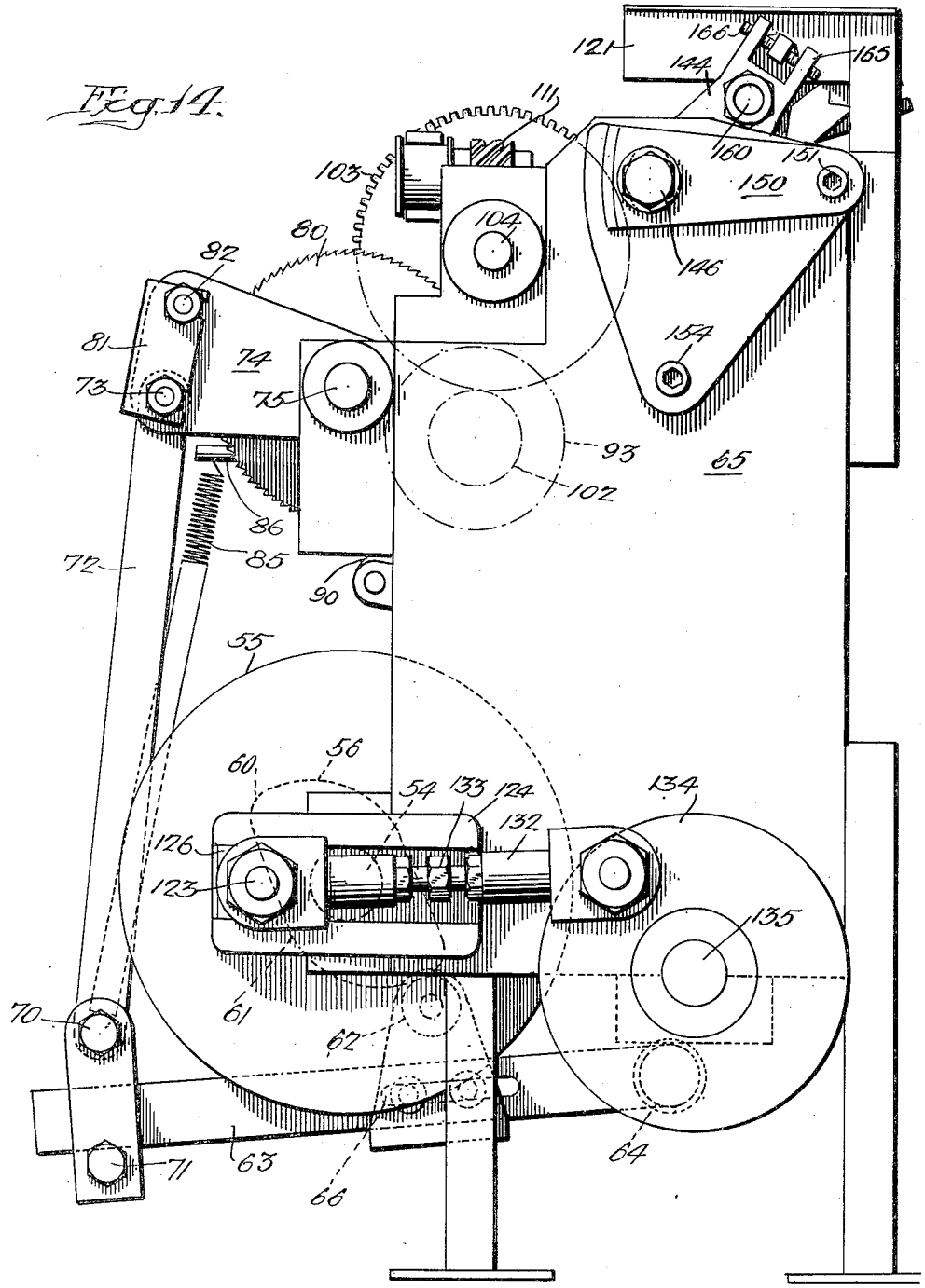
Figure 14 is a right side elevation of Figure 13.

Figure 19ª is an enlarged section on the line 19ª—19ª of Figure 19.

Figure 20 is a detail perspective of the adjustment of the tucking finger crank.

Figure 21 is a detail exploded perspective of the adjustment for the gripping roll positions.

Figure 22 is a diagrammatic view illustrating the crank, connecting rod and tucking finger positions.

In the drawings like numerals refer to like parts throughout.

My invention is directed particularly toward the achievement of readily adjustable and in many cases unusualy close spacing of sinuous bends in a sinuous ribbon formed from metallic wire or the like. The product of the invention has wide utility in numerous fields, both structurally for springs, wrist bands, jewelry components, upholstery and garment stiffening, supporting and spring components, and also in the electrical field for electrical resistors, heater units, and the like.

One of the special advantages of the invention is that a wide variation of wire sizes may be handled, and a great diversity of ribbon widths and sinuous bend spacings may be achieved without the delay and expense incident to the production of special rolls, formers, dies and the like, for each of the different sizes.

Using the present invention it is a matter of a few minutes or hours at most to readjust the machine from a condition in which one wire size, ribbon width and sinuous bend spacing are involved, to a condition in which entirely different wire size, ribbon width and sinuous bend spacing are employed. In the prior art practice with many machines this has not been possible. There is no inherent limitation in the closeness of sinuous bend in the device of the present invention other than the ability to produce a short bend in the particular wire, whereas in many of the prior art devices extremely close bends have been difficult or impossible.

In many of the prior art devices, parallelism of close bend sections in sinuous ribbon has not been obtainable, whereas by the present invention it is possible to produce reliable parallel bends.

At numerous points in the specification and claims, reference is being made to wire and it will be understood that in many cases the best application of the invention will be to conventional metallic wire of round cross section. It will be understood, however, that other cross sections may be employed, such as oval, square, rectangular and the like, and it will be understood that these are designated by the term wire, whether they are commonly known in the trade as wire, strip, tape, ribbon, or the like.

Referring particularly to Figure 7, I illustrate there a suitable wire 30 which is bent into sinuous bends 31 which form a ribbon 32 having transversely disposed sinuous bend sections 33 corresponding to the width of the ribbon and U-bends 34 at the edge of the ribbon. The distance 35 between adjoining sinuous bend sections is controllable and variable, and may be reduced to a negligible factor, in which case the adjoining sinuous bend sections 33 are practically touching. With this as one limit, the sinuous bends may be spaced so that the distance 35 is equal to the wire cross sectional diameter or greater than the wire cross sectional diameter. However, in most cases it is desirable to have the ribbon function structurally as a ribbon unit, and therefore close spacing is important.

I find that the sinuous ribbon is definitely superior structurally and electrically, because it is certain to function as a unit in handling or stress distribution, where it is a structural member or a spring, and because the heat distribution is much more effective when it functions as an electric heater or resistor, when a very close proximity between sinuous bend sections is maintained. This is best described as a proximity at least as close as that in which the sum of the surface of the wire is as great as the surface of a solid ribbon of the same external dimensions as the ribbon.

The center to center spacing used between adjoining return bend sections of the sinuous tape should very desirably be not greater than:

$$1.6\ D$$

where

D = the diameter of the wire cross section and will most desirably be approximately that given by the formula. For many purposes it will be most desirable if the spacing between adjoining sides of return bend sections is not less than the radius of the wire cross section, or preferably approximately the same as the radius of the wire cross section.

Gripping rolls 36 and 40 are positioned preferably on horizontal parallel axes with spacing 41 between the rolls determined by the size of the wire being handled and the degree of tightness of the grip desired. The rolls are moving oppositely and it is assumed for convenience that the direction of rotation is such that the wire 30 will be fed down in Figure 1. The condition shown in Figure 1 is that of starting the machine before any of the ribbon has been formed.

The first step is to bend a wire section 33 corresponding to a sinuous bend section and of width equal to the width of the ribbon transversely of the direction of ribbon progression and parallel with the axes of the rolls (parallel to one another), within the limits of the ends of the rolls, creating a substantialy right angle bend 42 (Figure 2) at the point where the wire is just above the area 43 gripped between the rolls, and preferably also a substantially right angle bend 44 at the opposite edge of the ribbon being formed. While this operation can take place during forward progression of the rolls (preferably slight), it will be evident of course that it is best to have the rolls stationary or substantially stationary while this bending is being done. The rolls in effect then act as a gripper to support the wire and hold it at the area 43, while the straightness of the sinuous bend section 33 is achieved in part by pushing into the converging space or mouth portion of the rolls which form a jaw in which the bend section 33 is produced. While as later described, the accomplishment of the bends 42 and 44 is best done by tucking fingers or other mechanism, it will be understood that these bends can be accomplished by hand or by any other suitable means. Once the sinuous bend section 33 has been formed, the rolls are suitably advanced as shown in Figure 3 until the bend section 33 is gripped in the space 41 between the rolls, and within the limit between the ends of the rolls, thus holding the wire and the portion of ribbon already formed. The next operation, accomplished in Figure 3, is opposite bending, forming a bend 45 which cooperates with the adjoining bend 44 to make a U-bend 34. Another sinuous bend section 33' is thus produced and an opposite bend 46. Once again the bend section 33' is formed in the converging jaw space between the rolls.

In order to produce uniformity in the ribbon, between the ends of the rolls, the lengths of the sinuous bend sections 33 and 33' should be the same within reasonable tolerance.

The next operation as shown in Figure 4 is the advancing of the rolls by one step so that the sinuous bend section 33' is now gripped in the space 41 between the rolls, and within the limits between the ends of the rolls, and the making of new opposite bends 50 and 51 to form a new sinuous bend section $33^2$.

Figure 5 shows advance for one additional step, with formation of the next sinuous bend section $33^3$, while the previous sinuous bend section $33^2$ is gripped in the space between the rolls.

Figure 6 shows the next step in which the next sinuous bend section $33^4$ has been formed while the previous sinuous bend section $33^3$ is gripped between the rolls at 31.

Thus it will be seen that an indefinite series of sinuous bend sections is produced while the previous formation is gripped by the rolls.

The preferred manner of accomplishing the bending into the jaw-like space between the rolls and within the limits between the ends of the rolls is shown in Figures 8 to 12, inclusive, which illustrate tucking fingers 52, 53 moving back and forth between limiting positions approximately 90° apart, on axes 146 approximately transverse to the roll axes. The fingers move in a plane extending preferably vertically between the rolls. It will be understood that the sinuous bend just formed is being gripped in the rolls as shown in Figures 1 to 6 inclusive, although the rolls are omitted for convenience in illustration in Figures 8 to 12.

In Figure 8 the tucking finger 52 has just completed its downward angular stroke into the jaw space between the rolls, thus creating the two bends corresponding, for example, with 45, 46 of the sinuous bend section 33'. The other tucking finger 53 is at the limit of its inoperative stroke and is not at the moment functioning.

In the next step as shown in Figure 9, the tucking finger 52 has begun its retraction stroke, but the sinuous ribbon has not yet been advanced by the rolls. The other tucking finger 53 remains substantially at the limit of the inoperative stroke. The fact that the roll has not yet moved forward is indicated by the relation of the sinuous bend section 33' to the line 43 indicating the gripping area.

As indicated in Figure 10, the rolls have advanced the sinuous tape one step so that the previously formed sinuous bend section 33' is now in the grip area 43. The tucking finger 52 has continued its retraction stroke and is almost out of the way of the next tucking operation, while the tucking finger 53 has begun its operative stroke and has actually engaged a portion of the wire. The rolls now preferably remain stationary, with the previously formed sinuous bend section 33' gripped between the rolls, while the tucking finger 52 continues its reverse stroke and the tucking finger 53 moves down and begins to form the next bend 50 and the following bend 51.

As seen in Figure 12, the tucking finger 52 has moved to the limit of its reverse stroke and the tucking finger 53 has completed its operative stroke finishing the formation of the bends 50 and 51 and the production of the next sinuous bend section $33^2$. This sinuous bend section $33^2$ is forced into and guided by the jaw formation or mouth due to the roll curvature, and therefore it is easy to achieve parallelism with the previous sinuous bend section 33' which is gripped in the bite of the rolls at 43.

The roll motion is preferably achieved in the mechanism of Figures 13 to 22 inclusive by a main drive shaft 54 driven by any suitable means, as by a pulley 55, and carrying a cam 56 having two high points 60 and two low points 61.

It is usually preferable to advance the rolls positively by the mechanism about to be described, but in some cases, particularly where the sinuous tape is so closely bent that one sinuous bend section touches another sinuous bend section during bending, it will be sufficient or even preferable to use rolls which are idlers and which are advanced by the forward movement of the sinuous tape under the action of the tucking fingers. Where this form of the invention is employed, the mechanism about to be described can be eliminated or rendered temporarily inoperative by removing a gear or other mechanical element in train.

However, in most cases, this idling of the rollers and advancement by advancing the tape and by forward motion of the tucking fingers will not be used, and where the sinuous bends do not actually touch during bending, as will quite frequently be the case, the operation of the rolls as idlers will not be practical.

A cam follower roller 62 is rotatably mounted on a follower lever 63 pivoted at 64 on the frame 65. In order to permit adjustment of the leverage for adjustment of the roll feed, the cam follower roller 62 is provided with an adjustable mounting 66 capable of longitudinal adjustment along the lever to the desired position by means of suitable cooperation between bolts and a slot as shown.

At a suitable position on the lever 63 I provide a pivot 70 adjustable by a clamp 71 along the length of the lever, and making pivotal connection to a ratchet connecting rod 72 which pivotally connects at 73 to a pawl carrier 74 pivoted on a shaft 75. The shaft 75 is mounted in suitable bearings in the frame, not shown.

As best seen in Figure 13, the pawl carrier 74 is of double construction, having side portions on either side of two ratchet wheels 76 and 80 both mounted on the shaft 75 but having their ratchet teeth slightly out of angular alignment and preferably spaced one-half pitch distance for more effective operation of the pawls. The pawl carrier mounts at its outer end a U-shaped member 81, which is locked about the ratchet connecting rod pivot 73, and mounts a pawl pivot 82, on which are pivoted two pawls 83, each cooperating with one of the ratchet wheels, and resiliently urged against the corresponding ratchet wheel as by sponge rubber 84 placed inside the U-shaped member 81 and behind the pawls.

The pawl carrier and the pawls are retracted by a suitable tension spring 85, engaged on the ratchet connecting rod pivot 70, against a spring abutment 86. Reverse motion of the ratchets during their retraction stroke is prevented by conventional detents 90 (only one of which is shown) which are urged toward the ratchets in the appropriate direction by resilient means such as sponge rubber 91.

The shaft 75 carries a spur gear 92 which meshes with a speed reduction gear train, initially represented by an intermediate gear 93 on a stub shaft 94 adjustably mounted for variation in gear size and ratio on a lever 95 pivoted at 96 on the frame and arcuately positioned by an arc adjustment 100. Longitudinal adjustment along the lever is provided at 101 by a suitable slot. The stub shaft 94 also carries a spur gear 102 which meshes with a cooperating spur gear 103 on a shaft 104 extending across the machine and mounted in suitable bearings. At spaced intervals on the shaft 104 are mounted spiral right angle transfer gears 105, 106, adjustably secured as by set screws to permit variation in their spacing as required. The spiral gears 105, 106 mesh with cooperating spiral gears 110, 111, on the transversely disposed shafts 112, 113, in suitable bearings, carrying the gripping rolls 36, 40 in spaced relation. Each gripping roll is journalled in a roll carrier 114 which makes key-way slot adjustable connection with a roll support plate 115 mounted suitably horizontally in the frame. The key-way slot connection 116 permits adjustment of the roll spacing by adjustment screws 120 interposed between the adjustable roll carriers 114 and the main frame.

Above the rolls and in line with the space between the rolls I provide a wire guide 121 having a slot 122 which centralizes the downward travel of the wire while permitting the wire to move longitudinally of the rolls.

The tucking motion as illustrated in Figures 8 to 12 inclusive, is provided by the main shaft 54 through a crank 123 adjustably mounted, as best seen in Figure 20, on a crank arm 124 which carries a T-slot 125 in which is positioned an adjustable block 126 carrying the crank 123, adjustment being provided by a screw 130 which is threaded into the block 126 and operates from an adjustment bearing 131. A connecting rod 132 is made adjustable as to length at 133 and makes rocking connection with a crank disc 134 to move the disc and its shaft 135 (supported on suitable bearings in the frame) back and forth through a stroke of approximately 90°. It should be noted that the shaft 135 does not rotate but merely rocks.

On the shaft 135 I provide crank discs 136, 140, each operatively connected to a connecting rod 141, 142 which is made adjustable as to length at 143. At the opposite end each connecting rod is pivotally connected to a tucking finger carrier 144, 145. The tucking finger carriers are pivotally supported on shafts 146, mounted on adjustable segments 150 pivotally mounted and locked at 151. The shafts 146 pass through slots 152 in adjustable carriers 153 which are swingably mounted and locked at 154. By this means it is possible through shifting the adjustments 151, 154 to obtain adjustment either vertically or horizontally to permit making of the ribbon wider or narrower as the case may be.

It will be understood that in order to make this adjustment possible, the frame 65 is slotted at 155 with ample allowance for adjustment in either direction, since the shaft 146 must pass through the frame at both sides to the respective tucking finger carriers.

Referring particularly to Figure 18, it will be evident that each tucking finger carrier 144 or 145 makes crank connection at 156, and near its outer end mounts a tucking finger chuck 160 which passes through an opening 161 in the tucking finger carrier to permit adjustment of the angle of the tucking finger with respect to the carrier, and with respect to the other tucking finger, and carries, on a squared portion 162, a suitable cooperating lever adjustment 163 having an extension 164 through yoke ends 165 of the tucking finger carrier, for adjustment by screws at 166 on either side. The tucking fingers themselves have shanks 170 (Figure 19) suitably provided with angular ends 171 for engagement in cooperating angular chuck extensions 172 on the tucking finger chuck. The tucking fingers are suitably held on the chuck by screws 173 passing through the extensions 172 and into the tucking finger shanks 170.

The ends of the tucking fingers are preferably elongated at 174 and suitably narrow to permit engagement with the wire over the full length of or slightly beyond the length of the sinuous bend sections 33 as seen in Figures 8 to 12 inclusive. In transverse section as shown in Figure 19ª, the ends of the tucking fingers are preferably slightly concave at 175 to assure engagement with the wire.

It will be evident that as best seen in Figure 17, the respective crank discs 136, 140 are positioned with their crank engagements with the connecting rods out of phase by a distance suitably slightly less than 90°. It will be understood that this angle will vary and may be adjusted by adjusting the set screw connections between each disc and the shaft 135.

With reference to Figure 22, the relative motions of the tucking fingers can be readily understood. Thus it will be understood that crank 136 has a lower limiting position 176, corresponding with a pivotal connection between the connecting rod and the tucking finger carrier 144 shown at 180, rocking the tucking finger chuck to the position 181 about the tucking finger pivot 146. This corresponds with an operative position of the tucking finger at the end of its stroke inward on completion of a bend. When this tucking finger is in the position just described, crank 140 of the opposite tucking finger will be at its opposite or fully retracted position 182 corresponding with a position 183 for the connecting rod pivot to the tucking finger carrier 145, moving the tucking finger chuck to the position 184 about its fixed pivot 146.

At the opposite end of the stroke, the crank 136 will reach the position 185, throwing the tucking lever chuck 160 of the tucking finger carrier 144 to the retracted position 186 about the fixed pivot 146. In this position the corresponding tucking finger on the chuck is at the end of its retracted stroke. At the same time the tucking finger crank 140 moves to its position 190, carrying the pivotal connection between the connecting rod and the corresponding tucking finger carrier to the position 191, which moves the tucking finger carrier to the position 192 about its fixed pivot 146. This corresponds with the completion of a bend on the sinuous ribbon.

It will be evident as previously described that in some cases, especially where extremely close bends are being made, the rolls may be operated simply as idlers as previously described and in such cases the mechanism for advancing the rolls may be omitted or rendered temporarily inoperative by removing a gear or the like. The tucking fingers will then perform the function of advancing the tape and advancing the rolls as they complete each bend, without the necessity of changing the tucking finger mechanism or changing the mechanism shown in the drawing except to render the forward drive of the rolls temporarily inoperative.

In order to start up the equipment, it is convenient to be able to shift the rolls without moving the tucking fingers, so as to accomplish initial gripping and feeding of the wire. For this purpose I provide a handle 193 on shaft 75.

In operation, once the wire has been fed through the rolls, and the machine started, rolls will move intermittently at a time immediately after the completion of each sinuous bend section and before the beginning of the next sinuous bend. This is accomplished by a high point 60 of the cam 56 moving the follower roller 62 and rocking the lever 63 to pull the ratchet connecting rod 72 down, pulling down the pawls 83 and advancing the ratchet wheels 76, 80, thus advancing the ratchet shaft 75 to turn the gears 92, 93, 102, 103 to rotate the shaft 104 and turn the spiral gears 105, 106, respectively advancing the cooperating spiral gears 110, 111 to drive forward the rolls 36, 40.

During the advance of the rolls, the retraction of the formerly operative tucking finger is accomplished, preparatory to advance of the other tucking finger.

It will be evident that the advance of the other tucking finger is retarded during this portion of the stroke because the corresponding crank 136 or 140 is close to dead center and very little motion of the forwardly moving tucking finger across during this portion of the cycle. After the advance of the rolls has been completed however, and the corresponding crank 136 or 140 is further away from dead center, advance of the forwardly moving tucking finger takes place relatively rapidly.

The advance of the forwardly moving tucking finger is accomplished through the main drive shaft 54 which operates the crank 123 and connecting rod 132 to rock the disc 134, rocking the shaft 135 and correspondingly rocking the crank discs 136, 140. This rocking of the crank discs appropriately reciprocates their connecting rods 141, 142, out of phase with one another somewhat less than 90°, causing the tucking finger carriers to rock about their pivots and moving the tucking fingers in the manner shown in Figures 8 to 12 inclusive.

Thus after one forward motion of the rolls, one tucking finger retracts and the other one advances and completes a bend section, and during the next advance of the rolls that tucking finger retracts while the other tucking finger effectively remains inoperative. After this advance of the rolls has been completed the procedure is reversed, the next tucking finger moves forward, and the other tucking finger completes its retraction.

This procedure goes on indefinitely to produce the sinuous tape.

In order to adjust to different sizes of wire, the roll spacing is adjusted by manipulating the appropriate adjusting screws 120, while at the same time the roll feed is appropriately adjusted as by manipulating the adjustments at 66 and 71. The roll feed is also adjusted at 66 and 71 if the spacing of the sinuous bends is to be changed for any given wire.

For adjustment of the tucking action to obtain different widths of ribbon, the adjustment of the segment 150 and the segment carrier 153 is accomplished with appropriate change of the angle of the tucking finger by adjusting chuck 160. Likewise adjustment can be made of the position of the crank 123, and if desired the adjustment can be made at 100, 101 to accommodate different gearing, and also if desired the relation between the cranks 136 and 140 can be changed by adjusting their postion on the shaft 135 through the change in set screw position. Similarly the lengths of the connecting rods 141 and 142 can be adjusted. By this means it is possible to vary the suitability of the machine for forming various wires and producing various sinuous ribbons in infinite variety and with great speed.

It will be evident that the wire is conveniently passed through an aperture 195 in the roll support plate 115 (Figure 21) while the connecting rods 141, 142 are carried through suitable apertures 196 in the same plate.

It will be evident that one end of each tucking finger is preferably located at the pivot 146 of the tucking finger carrier as shown in Figures 8 to 12, so that in order to accomplish adjustment as to width on the same wire it is commonly only necessary to move the tucking finger pivots farther apart to make the ribbon narrower, and closer together to make the ribbon wider.

It will be evident that the sinuous ribbon of my invention is of wide utility. In the spring field, it is applicable for tension, compression, and torsion springs, for upholstery and furniture springs, for garment springs, stays and stiffeners, for jewelry components and bands such as wrist watch bands, and for tool components such as the tines of rakes, combs and the like.

In the electrical field, the sinuous ribbon of the invention is substantially as effective for heat dissipation as a solid ribbon of the same overall dimensions where the surface of the wire is as great or greater than the corresponding surface of a solid ribbon, and is, of course, much more efficient from a space economy standpoint because of the much greater electrical resistance and the fact that practically all surfaces are outwardly exposed for radiation, rather than being only partly available as in the case of a flat coil or helix, or the like.

It will be evident that the exact contour of the final sinuous ribbon will depend to some extent upon the character of wire or the like from which the product is made; obviously a very soft wire will bend readily and have little spring-back, so that the sinous bend sections produced in the converging jaw-like space at the inlet side of the rolls will be both quite straight from side to side and also quite parallel where the positioning and movement of the tucking finger is selected with a view to obtaining exact parallelism.

It will be evident, however, that where a harder wire is used, whether inherently harder due to the nature of the metal or alloy or due to the previous cold work put on the wire, the sinuous bend sections are less likely to be straight, since they will take on some bowing due to the hairpin bend, and also the springback is likely to be sufficiently pronounced so that slight lack of parallelism in the sinuous bend sections will occur. Thus it is within the choice of the user to obtain a lesser or greater degree of straightness in the sinuous bend sections and a closer or less close approach to parallelism among the sinuous bend sections.

In view of my invention and disclosure variations and modifications to meet individual whim or particular need will doubtless become evident to others skilled in the art, to obtain all or part of the benefits of my invention without copying the process, apparatus or product shown, and I, therefore, claim all such insofar as they fall within the reasonable spirit and scope of my claims.

Having thus described my invention what I claim as new and desire to secure by Letters Patent is:

1. In a wire bending machine, a pair of cooperating rolls having generally parallel axes and receiving wire from a direction generally transverse to the axes, means for intermittently advancing the rolls and means for bending the wire directly at the rolls back and forth into the converging jaw space on the approaching sides of the rolls and within the limits between the ends of the rolls during the stop periods of the intermittent motion, making one bend during each stop while holding the previous bend in the bite of the rolls.

2. In a wire bending machine, a plurality of cooperating rolls having generally parallel axes and receiving wire from a direction generally transverse to the axes, means for advancing the rolls and tucking fingers moving in a plane extending between the rolls and tucking the wire from one side and then the other into the converging jaw space between the rolls.

3. In a wire bending machine, a pair of cooperating rolls having generally parallel axes and receiving wire gripped between the rolls from a direction generally transverse to the roll axes, means for advancing the rolls intermittently, tucking fingers having a range of motion in a plane extending between the rolls and means for moving the tucking fingers alternately back and forth to tuck the wire into the converging jaw space between the rolls during stop periods of the rolls, with one forward motion of one of the tucking fingers in each stop period, whereby the wire is formed into a sinuous ribbon.

4. In a wire bending machine, a pair of cooperating rolls having generally parallel axes and receiving wire from a direction generally traverse to the axes, tucking fingers each pivoted on an axis transverse to the roll axes and moving in a plane extending between the rolls, means for moving the tucking fingers alternately into and out of the converging jaw space on the approaching side of the rolls and means for moving the tucking fingers toward and away from one another to control the width of a sinuous ribbon produced by the tucking fingers.

5. In a wire bending machine, a pair of cooperating rolls having generally parallel axes and receiving wire from a direction generally transverse to the axes, tucking fingers each pivoted on an axis transverse to the roll axes and moving in a plane extending between the rolls, means for moving the tucking fingers alternately into and out of the converging jaw space on the approaching side of the rolls, means for intermittently advancing the rolls during periods when the tucking fingers have completed their forward bend-producing stroke, and means for moving the tucking finger axes toward and away from one another to control the width of a sinuous ribbon produced by the tucking fingers.

6. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, and means for moving the tucking fingers alternately in and out in synchronism with the rolls and during periods when the roll motion is stopped.

7. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during periods when the roll motion is stopped, and means for adjusting the spacing between the axes of the tucking fingers.

8. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during periods when the roll motion is stopped, means for adjusting the spacing of the tucking finger axes and means for adjusting the extent of angular movements of the tucking fingers.

9. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during periods when the roll motion is stopped, means for adjusting the spacing between the axes of the tucking fingers, means for adjusting the angular movements of the tucking fingers, and means for adjusting the angle at which the tucking fingers are positioned with respect to one another.

10. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during periods when the roll motion is stopped, means for adjusting the extent of angular movement of the tucking fingers and means for adjusting the angular relation of one tucking finger to another.

11. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during a period when the roll motion is stopped, means for adjusting the extent of angular movement of the tucking fingers as a group, means for separately adjusting the extent of angular movement of each tucking finger, and means for adjusting the distance between the axes of the respective tucking fingers.

12. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during a period when the roll motion is stopped, means for adjusting the pivot positions of the tucking fingers and means for adjusting the angular throws of the tucking levers.

13. In a wire bending machine, a pair of cooperating rolls having generally parallel axes and adapted to receive wire coming from a direction generally transverse to the axes, means for adjusting the spacings of the rolls, means for intermittently moving the rolls forward, means for adjusting the forward travel of the rolls, tucking fingers pivoted on axes transverse to the axes of the rolls and moving alternately into and out of the converging jaw space on the approaching side of the rolls in a plane extending between the rolls, means for moving the tucking fingers alternately in and out in synchronism with the rolls and during a period when the roll motion is stopped, means for adjusting the pivot position of the tucking fingers, means for adjusting the angular throws of the tucking fingers, and means for adjusting the angles of the fingers with respect to one another.

14. In a wire bending machine, a pair of cooperating rolls having generally parallel axes and adapted to receive wire coming from a direction generally transverse to the axes, means for progressing the rolls, tucking fingers pivoted on axes transverse to the axes of the rolls and moving alternately into and out of the converging jaw space on the advancing side of the rolls in a plane extending between the rolls, means for adjusting the tucking fingers for total angular movement synchronized with respect to the advance of the rolls, means for adjusting the tucking fingers for individual angular movement with respect to one another, means for adjusting the tucking fingers for angular relationship at any momentary position with respect to one another, means for adjusting the tucking fingers for pivotal spacing from one another and means for adjusting the tucking fingers for pivotal position individually with respect to one another.

15. In a wire bending machine, cooperating rolls having parallel axes, ratchet means advancing the rolls in unison intermittently, tucking fingers moving alternately into and out of the converging jaw space between the rolls, and means for moving the tucking fingers in synchronism with the ratchet means so that the tucking fingers advance into the jaw space only when the rolls are stationary.

16. In a wire bending machine, a pair of cooperating rolls, means for progressing wire through the rolls to be gripped by the rolls and tucking fingers moving in a plane extending between the rolls, tucking the wire from one side and then the other into the converging jaw space between the rolls and advancing the wire and the rolls as idlers.

RICHARD L. FEARN.

REFERENCES CITED

The following references are of record in the file of this patent:

UNITED STATES PATENTS

| Number | Name | Date |
| --- | --- | --- |
| 456,533 | Bold | July 21, 1891 |
| 1,193,742 | Wadsworth | Aug. 8, 1916 |
| 1,219,845 | Nelson | Mar. 20, 1917 |
| 1,246,145 | Nelson | Nov. 13, 1917 |
| 1,657,695 | Richardson | Jan. 31, 1928 |
| 2,033,423 | Frank | Mar. 10, 1936 |
| 2,047,001 | Cammen | July 7, 1936 |
| 2,047,717 | Van Dresser et al. | July 14, 1936 |
| 2,454,290 | Payne | Nov. 23, 1948 |

FOREIGN PATENTS

| Number | Country | Date |
| --- | --- | --- |
| 275,319 | Germany | Apr. 1, 1913 |